Patented Apr. 15, 1947

UNITED STATES PATENT OFFICE

2,419,142

TREATMENT OF ALKYL KETONES TO FORM CONDENSATION PRODUCTS THEREOF

Vladimir N. Ipatieff and Carl B. Linn, Riverside, Ill., assignors to Universal Oil Products Company, Chicago, Ill., a corporation of Delaware No Drawing. Application June 29, 1944, Serial No. 542,806

6 Claims. (Cl. 260—668)

This invention relates to a process for treating an alkyl ketone with a particular catalytic material to produce unsaturated organic compounds. More specifically, the invention is concerned with a process for manufacturing mesitylene from acetone.

An object of this invention is to provide an improved process for converting alkyl ketones into polyalkyl benzene hydrocarbons.

Another object of this invention is the production of mesitylene from acetone. A further object of this invention is the production of a less saturated compound by the treatment of an alkyl ketone at a temperature of from about 150° to about 450° C. in the presence of a catalyst prepared by treating with a reducing gas a composite comprising essentially copper oxide, zinc oxide, and alumina.

A still further object of this invention is the condensation of an alkyl ketone to form an unsaturated carbonyl compound of higher molecular weight than said alkyl ketone.

Another object of this invention is the production of an unsaturated hydrocarbon by the treatment of an alkyl ketone at a temperature of from about 250° to about 450° C. in the presence of a catalyst prepared by treating with a reducing gas a composite comprising essentially copper oxide, zinc oxide, and alumina.

One specific embodiment of this invention relates to a process which comprises reacting an alkyl ketone at a temperature of from about 150° to about 450° C. in the presence of a reduced catalyst comprising copper, zinc, and alumina.

A further embodiment of this invention relates to a process for producing mesitylene which comprises reacting acetone at a temperature of from about 250° to about 400° C. in the presence of a catalyst comprising copper, zinc, and alumina.

Alkyl ketones utilizable as starting materials for our process comprise dialkyl ketones and alkyl aryl ketones. We prefer to charge to our process methyl ketones including acetone, methyl ethyl ketone, methyl propyl and methyl isopropyl ketones, other methyl alkyl ketones, acetophenone, etc. These compounds yield mesitylene type hydrocarbons. However, aliphatic ketones other than the methyl ketones are converted by our process into unsaturated organic compounds including unsaturated ketones and olefins and also into hexa-alkyl benzene hydrocarbons. These organic compounds are unsaturated in that they can be reacted with hydrogen in the presence of a hydrogeneration catalyst to produce saturated ketones and saturated hydrocarbons.

The composite catalyst utilizable in our process may be prepared by different procedures, but we have obtained highly active catalysts by suspending alumina in an aqueous solution of copper and zinc salts, and precipitating copper and zinc carbonates upon the alumina by the addition of a water-soluble carbonate, particularly ammonium carbonate. The precipitation may be made at temperatures of from about 20° to about 100° C. The total suspended material in a precipitation mixture including the precipitates of copper carbonate and zinc carbonate deposited on alumina particles is then filtered, washed carefully with water to remove soluble salts, dried at a temperature of from about 180° to about 200° C. for 10 to 20 hours, and then pelleted or otherwise formed into particles of definite shape and size, usually with the addition of a small amount of a lubricant, such as, for example, naphthalene which is generally extracted with acetone before reducing the formed particles with hydrogen or another reducing gas prior to employment in the ketone conversion process. Instead of hydrogen, dry carbon monoxide or a mixture of dry hydrogen and dry carbon monoxide may be used in this reduction. The catalyst is reduced with hydrogen at the temperature needed for our ketone conversion reaction, but higher reduction temperatures are also employed in some instances. A composite of these materials, which is utilized as a catalyst for reactions in accordance with the present invention, may be made by the general process of precipitating the carbonates of zinc and copper from the metallic salts, particularly the nitrates, by the addition of soluble carbonates, particularly ammonium carbonate, in amounts slightly in excess of that required for complete precipitation. The precipitation may be made at ordinary or elevated temperatures up to approximately 100° C. The total suspended material including the precipitates of zinc carbonate and copper carbonate on alumina particles is then filtered, carefully washed with water to remove soluble salts, dried at temperatures of from approximately 180° to about 200° C. for from about 10 to about 20 hours and then pelleted or otherwise formed into particles of definite shape and size, usually with the addition of a small amount of a lubricant, such as, for example, a hydrogenated vegetable or animal oil. The particles are then subjected to the action of dry hydrogen at temperatures up to about 600° C. which results in the removal of the lubricating material and reduction of the carbonates, first to the oxides and then to the metals. In place of hydrogen, dry carbon monoxide or a dry mixture of hydrogen and carbon monoxide may be used for the reduction. Alternatively, the pellets may be treated first with dry air or other gases to remove the lubricant before reduction.

The proportions of copper, zinc, and alumina in composite catalysts prepared and reduced by the above-described general methods are varied considerably to produce catalysts with different activities for converting acetone and other alkyl ketones into poly-alkyl benzene hydrocarbons and also into unsaturated ketones of higher molecular weight than the alkyl ketone charged to the process.

Good catalysts are prepared, for example, which contain 25 parts by weight of copper, 25 parts by weight of zinc, and 50 parts by weight of alumina, while others consist of approximately equal parts by weight of zinc, copper, and alumina. Some catalysts still exhibit high activity when the zinc concentration is approximately 7% and the copper concentration is approximately 3.5% by weight.

The process of our invention is carried out using either batch type treatment or a continuous treatment. Batch type conversion of an alkyl ketone is carried out by subjecting said ketone and a catalyst of the type herein described to contact in an autoclave at a temperature of from about 150° to about 450° C. and at a pressure generally up to about 100 atmospheres, or more. After this treatment, the reaction product is fractionated to separate unconverted ketone and small amounts of unsaturated ketones from the poly-alkyl benzene hydrocarbon formed by condensation of the ketone originally charged to the process.

Catalyst particles comprising copper, zinc, and alumina and prepared as indicated contain zinc oxide and incompletely reduced copper oxide. Such catalysts are utilizable as fillers in suitable reactors through which the ketone is passed in the presence or absence of a suitable solvent such as cyclohexane at a temperature of from about 150° to about 450° C. and at a pressure generally of from about 50 to about 200 atmospheres. The catalyst activity, catalyst temperature, the pressure, and ketone charging rate are chosen to give the optimum desired degree of conversion of the alkyl ketone.

Also, conversion of alkyl ketones into alkyl benzene hydrocarbons and less saturated organic materials is effected in the presence of powdered catalyst mixed therewith and passed through a suitable reactor operated under substantially the conditions indicated. The reaction products formed in the presence of either a fixed catalyst or powdered catalyst are separated from the catalytic material and fractionated to separate desired products from unconverted charging stock and decomposition products. Said unconverted charging stock and sometimes a portion of the decomposition products are recycled to further contact with the catalyst to form an additional quantity of the ketone condensation products.

In order to obtain a relatively high yield of mesitylene from acetone or of other poly-alkyl benzene hydrocarbons from methyl ketones, we prefer to operate our process in a continuous manner. Also, the catalyst temperature employed for producing mesitylene and its homologs is preferably from about 250° to about 400° C. when operating at a pressure of from about 35 to about 100 atmospheres and charging the alkyl ketone at an hourly liquid space velocity of from about 1 to about 2. When a lower catalyst temperature is used, there is a relatively large production of mesityl oxide, particularly when the alkyl ketone charging rate is relatively high as when using an hourly liquid space velocity greater than 2. However, the use of relatively low space velocities, generally less than 1 and at temperatures of from about 300° to about 400° C. at 70 atmospheres pressure, results in the production of relatively high yields of isobutylene and acetic acid. Accordingly, the type of reaction product is governed by the choice of catalyst and the operating conditions used. The activity of the catalyst is also dependent upon the temperature at which the catalyst is reduced before being utilized in each ketone conversion process.

Ketone conversion catalysts are also prepared by precipitating carbonates of copper and zinc upon alumina and compositing the resultant material with a substantially inert support such as silica, silica-alumina composites, etc.

The various catalysts prepared as outlined herein are generally hard and resistant to breakage, having relatively high activity due to the generally porous character of the metals formed by reduction of copper carbonate and zinc carbonate, and, owing to their high activity, they may be utilized over extended periods of time without the formation of excessive deposits of carbon which would necessitate reactivation.

The following examples are given to indicate the type of results obtained in our process although not with the intention of limiting unduly the broad scope of the invention.

EXAMPLE I

The catalyst employed in this run was prepared as follows: 303 grams of copper nitrate trihydrate and 366 grams of zinc nitrate hexahydrate were mixed with 2000 grams of water and the resultant solution was heated to 90° C. The solution was then decanted from a small amount of undissolved material, 100 grams of powdered Activated Alumina was added to the clear solution and stirred vigorously at 90° C., while an aqueous solution containing 255 grams of hydrated ammonium carbonate was added thereto in order to precipitate copper carbonate and zinc carbonate upon the Activated Alumina. The precipitation mixture was cooled, then filtered with suction and washed with 8 liters of water, after which the filtrate was free from cupric ions. The washed precipitate was dried at 200° C. for 20 hours and then reduced by heating in a stream of hydrogen at 235° C. for 24 hours. The reduced material was then formed into particles either by pressing hydraulically or by a pilling machine, using naphthalene as a pilling lubricant. The naphthalene was then extracted from the catalyst pellets with acetone, after which the catalyst pellets were placed in the steel reaction tube and heated in a current of hydrogen for 5 to 10 minutes at the temperature of the reaction just before the alkyl ketone was charged thereto or before the catalyst was employed in an autoclave.

157 grams of acetone and 25 grams of the above-described catalyst were placed in a rotatable steel autoclave and heated at 250° C. for 12 hours at a pressure of 50 atmospheres. The 151 grams of liquid product recovered from this treatment contained 121 grams of unconverted acetone, 4 grams of water, 16 grams of mesityl oxide, 2 grams of mesitylene and 8 grams of higher boiling liquids.

EXAMPLE II

Continuous runs were made by charging acetone at an hourly liquid space velocity of 0.5 through a steel reactor of 14 mm. diameter containing 60 cubic centimeters of the pelleted catalyst described in Example I. In these different runs, the reaction tube and catalyst were maintained at temperatures of 250°, 300°, 350° and 400° C., and the pressure was 70 atmospheres. The results obtained in these runs are given in Table I.

TABLE I

*Acetone reacted over zinc oxide-alumina-copper catalyst*

| Run No. | 2 | 3 | 4 | 5 |
|---|---|---|---|---|
| Conditions: | | | | |
| Temperature, °C | 300 | 300 | 350 | 400 |
| Duration of Test, Hrs | 7.3 | 21.2 | 19.8 | 24.0 |
| Total Charge, Grams: Acetone | 186 | 502 | 473 | 654 |
| Recovery, Grams:[1] | | | | |
| Cond. Gas | | | 5 | 20 |
| Upper Layer | 162 | 484 | 356 | 515 |
| Lower Layer | 0 | 0 | 85 | 81 |
| Loss | 24 | 18 | 27 | 38 |
| Composition of Upper and Lower Layers, Grams: | | | | |
| Acetone | 121 | 339 | 230 | 324 |
| Water | 8 | 30 | 52 | 70 |
| Fraction, b. p. 60–120° C | 2 | 8 | 3 | 10 |
| Mesityl Oxide, b. p. 120–135° C | 13 | 31 | 12 | 28 |
| Fraction, b. p. 135–155° | 1 | 2 | 3 | 9 |
| Mesitylene, b. p. 155–170° | 9 | 34 | 63 | 54 |
| Fraction, b. p. 170–200° | 1 | 2 | 2 | 5 |
| Fraction, b. p. 200–208° | 1 | 2 | 4 | 5 |
| Isophorone, b. p. 208–220° | 4 | 16 | 21 | [2]36 |
| Residue boiling above 220° C | 3 | 20 | 51 | 54 |
| Acetone Reacted: | | | | |
| Grams | 65 | 145 | 243 | 330 |
| Weight per cent of that charged | 35 | 29 | 51 | 51 |
| Yield, Wt. per cent of Acetone Reacted: | | | | |
| Mesityloxide | 20 | 21 | 5 | 8 |
| Mesitylene[3] | 14 | 23 | 26 | 16 |
| Isophorone | 6 | 11 | 9 | 11 |
| Composition of Cond. Gas, Mol per cent: | | | | |
| Carbon dioxide | | | 28.8 | 26.8 |
| C3 fraction | | | | 13.0 |
| Isobutylene | | | 63.0 | 46.8 |
| n-butylene | | | 0.9 | 1.5 |
| Butane | | | | 6.6 |
| C5 fraction | | | 7.3 | 5.3 |

[1] Non-condensible gas not determined.
[2] Identified as mainly isophorone by semicarbazone derivative.
[3] Theoretical 69%.

In the runs shown in Table I, fresh catalyst was used in run 2 and then the same sample of catalyst was used in runs 3, 4, and 5 in sequence. At 300° C. catalyst temperature, mesityl oxide and mesitylene were both formed in substantial amounts. As the catalyst temperature was increased, the mesityl oxide yield decreased while the mesitylene yield increased to a maximum of 350° C. and then decreased when the temperature was increased further to 400° C. Upon the basis of the amount of acetone which reacted, the maximum yield of mesitylene was 26%. Runs 2 to 5 also yielded from 6 to 11% of isophorone. Furthermore, the runs at 350° and at 400° C. gave substantial amounts of condensible gas containing large amounts of isobutylene.

EXAMPLE III

The catalyst prepared as described in Example I, was mixed with naphthalene and formed into pellets. After the naphthalene was extracted from these pellets with acetone, they were charged to the steel reaction tube referred to in Example II. Acetone was then passed through this catalyst tube at 70 atmospheres pressure and at the different temperatures indicated in Table II and at hourly liquid space velocities of from 0.9 to 3.9.

TABLE II

*Acetone reacted over zinc oxide-alumina-copper catalyst*

| Run No. | 6 | 7 | 8 | 9 | 10 | 11 | 12 |
|---|---|---|---|---|---|---|---|
| Conditions: | | | | | | | |
| Temperature, °C | 200 | 250 | 300 | 300 | 350 | 350 | 350 |
| Liq. Space Velocity | 1.1 | 0.9 | 1.0 | 2.1 | 1.0 | 2.0 | 3.9 |
| Duration of Test, Hrs | 36.3 | 22.8 | 19.6 | 19.2 | 21.1 | 8.5 | 6.4 |
| Charge: Acetone, grams | 1,860 | 979 | 945 | 1,920 | 994 | 810 | 1,185 |
| Recovery, grams: | | | | | | | |
| Non-cond. Gas | Trace | Trace | Trace | Trace | 6 | Trace | Trace |
| Cond. Gas | 1 | 1 | 12 | 5 | 50 | 8 | 4 |
| Liquid Product | 1,730 | 955 | 911 | 1,884 | 917 | 796 | 1,174 |
| Loss | 29 | 24 | 23 | 45 | 21 | 6 | 7 |
| Analysis of Liq. Prod., grams: | | | | | | | |
| Acetone | 1,709 | 809 | 703 | 1,496 | 579 | 547 | 846 |
| Water | 14 | 24 | 48 | 79 | 107 | 72 | 77 |
| Fraction, b. p. 60–120° C | 2 | 1 | 1 | 9 | 2 | 1 | 1 |
| Mesityloxide, b. p. 120–135° | 98 | 100 | 77 | 190 | 46 | 55 | 126 |
| Fraction, b. p. 135–155° | | 3 | 4 | 5 | 4 | 4 | 3 |
| Mesitylene, b. p. 155–170° | | 8 | 56 | 51 | 125 | 61 | 33 |
| Fraction, b. p. 170–206° | 7 | 5 | 4 | 8 | 6 | 4 | 7 |
| Isophorone, b. p. 206–220° | | 0 | 6 | 22 | 11 | 24 | 51 |
| Residue boiling above 220° C | | 5 | 12 | 24 | 37 | 28 | 31 |
| Acetone Reacted, grams | 151 | 170 | 242 | 424 | 424 | 263 | 339 |
| Percent Charge, Reacted | 8.1 | 17.4 | 25.6 | 22.1 | 46.3 | 32.5 | 28.6 |
| Wt. Percent of Acetone Reacted: | | | | | | | |
| Mesityloxide | 65 | 59 | 32 | 45 | 11 | 21 | 37 |
| Mesitylene | 4 | 5 | 22 | 12 | 30 | 23 | 10 |
| Isophorone | | | 2 | 5 | 3 | 9 | 15 |
| Analysis Cond. Gas, Mol Per Cent: | | | | | | | |
| Carbon dioxide | | | 14.7 | | 12.4 | | |
| Ethylene | | | | | 2.7 | | |
| Ethane | | | | | 1.3 | | |
| Propylene | | | 9.3 | | | | |
| Propane | | | 0.9 | | | | |
| Iso-butylene | | | 71.7 | | 77.8 | | |
| n-butylene | | | 2.5 | | 1.7 | | |
| Butane | | | 0.9 | | 4.1 | | |

In runs 6 to 12 the same catalyst was used throughout and acetone was passed continuously over the catalyst while the temperature and space velocity were varied. Thus, the catalyst was in use for about 140 hours during which there was no evidence of carbon formation upon the catalyst.

The results given in Table II show that formation of mesityl oxide was favored by low catalyst temperatures and high liquid space velocities. Mesitylene formation increased at higher temperatures and the highest yield of mesitylene obtained, namely 30% based upon the acetone which reacted, was obtained at 350° C. and with an hourly liquid space velocity of 1. At higher hourly liquid space velocities of acetone, the yield of mesitylene decreased below this 30% value. Since theoretically 100 grams of acetone can produce only 68.8 grams of mesitylene, the yield of mesitylene obtained in run 10 was 44% of the possible yield. Formation of isophorone was favored by both high temperature and high hourly liquid space velocities. Thus, at 350° C. and at space velocities of 1, 2 and 4, the respective yields of isophorone were 3, 9, and 15%, based upon the weight of acetone reacting. A substantial amount of gas, chiefly isobutylene, was formed at 300° and at 350° C. when operating with low space velocities.

EXAMPLE IV

A catalyst prepared as described in Example I and Example III was employed in runs 13 to 16, inclusive at 300° C. with acetone charged at an hourly liquid space velocity of about 1 and at pressures of from 7.8 to 96 atmospheres. Results obtained in these runs are listed in Table III.

TABLE III

*Conversion of acetone into mesitylene, mesityl oxide, and isophorone*

| Run | 13 | 14 | 15 | 16 |
|---|---|---|---|---|
| Conditions: | | | | |
| Pressure, Atmos. | 7.8 | 28.2 | 7.0 | 96 |
| Hourly Liq. Space Velocity | 0.9 | 1.0 | 1.0 | 1.0 |
| Acetone reacted, per cent of that charged | 17.6 | 27.1 | 26.3 | 31.2 |
| Yields, Wt. per cent Acetone Reacted: | | | | |
| Mesityloxide | 32 | 33 | 35 | 26 |
| Mesitylene | 7 | 15 | 13 | 9 |
| Isophorone | 3 | 4 | 6 | 4 |
| Residue boiling above 220° C. | 3 | 8 | 6 | 5 |
| Non-Cond. Gas | 0.6 | trace | trace | trace |
| Cond. Gas | 15 | 4.6 | 1.2 | trace |

In these runs made at 300° C., there was less formation of condensible gas at increased pressures and the conversion of acetone per pass increased with pressure. However, the ultimate yields of the principal reaction products were substantially the same in these runs.

The character of the process of the present invention and its commercial value are evident from the preceding specification and examples, although neither section is intended to limit unduly the broad scope of the invention.

We claim as our invention:

1. A process for dehydrating ketones which comprises reacting an alkyl ketone in the absence of free hydrogen at a temperature of from about 150° to about 450° C. in the presence of a catalyst prepared by treating with a reducing gas a composite comprising essentially copper oxide, zinc oxide, and alumina.

2. A process for dehydrating ketones which comprises reacting a methyl ketone in the absence of free hydrogen at a temperature of from about 150° to about 450° C. in the presence of a catalyst prepared by treating with a reducing gas a composite comprising essentially copper oxide, zinc oxide, and alumina.

3. A process for dehydrating ketones which comprises reacting a methyl ketone in the absence of free hydrogen at a temperature of from about 250° to about 400° C. and at a pressure up to about 100 atmospheres in the presence of a catalyst prepared by treating with a reducing gas a composite comprising essentially copper oxide, zinc oxide, and alumina.

4. A process for dehydrating acetone which comprises reacting acetone in the absence of free hydrogen at a temperature of from about 250° to about 400° C. and at a pressure of from about 35 to about 100 atmospheres in the presence of a catalyst prepared by treating with a reducing gas a composite comprising essentially copper oxide, zinc oxide, and alumina, and recovering mesitylene from the resultant dehydration products.

5. A process for dehydrating ketones which comprises reacting an alkyl ketone in the absence of free hydrogen at a temperature of from about 150° C. to about 450° C. in the presence of a catalyst comprising copper, zinc, and alumina.

6. A process for dehydrating acetone to form mesitylene which comprises reacting acetone in the absence of free hydrogen at a temperature of from about 250° C. to about 400° C. and at a pressure of from about 35 to about 100 atmospheres in the presence of a catalyst comprising copper, zinc, and alumina.

VLADIMIR N. IPATIEFF.
CARL B. LINN.

REFERENCES CITED

The following references are of record in the file of this patent:

UNITED STATES PATENTS

| Number | Name | Date |
|---|---|---|
| 1,977,178 | Dohse | Oct. 16, 1934 |
| 2,334,100 | Ipatieff et al. | Nov. 9, 1945 |

OTHER REFERENCES

Beilstein, 4th ed., vol. I, second suppl., pages 703 and 793; vol. V second suppl., page 314.

Ipatieff, "Berichte," 59B, pp. 2035–8 (1926). (Above citation available in the Scientific Library.)